United States Patent
Lafitte et al.

(10) Patent No.: US 8,567,572 B2
(45) Date of Patent: Oct. 29, 2013

(54) CONTROLLED-FRICTION SLIDING DEVICE, SUCH AS A DAMPER, WHICH CAN OPERATE IN TWO DIRECTIONS

(75) Inventors: Arnaud Lafitte, Chaville (FR); Sabien Verlyck, Auterrive (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 116 days.

(21) Appl. No.: 13/254,535

(22) PCT Filed: Apr. 6, 2010

(86) PCT No.: PCT/EP2010/054540
§ 371 (c)(1),
(2), (4) Date: Sep. 2, 2011

(87) PCT Pub. No.: WO2010/115896
PCT Pub. Date: Oct. 14, 2010

(65) Prior Publication Data
US 2011/0315495 A1  Dec. 29, 2011

(30) Foreign Application Priority Data

Apr. 6, 2009  (FR) ...................................... 09 01682

(51) Int. Cl.
*F16F 7/08*  (2006.01)
(52) U.S. Cl.
USPC .............................. 188/67; 188/134; 188/381
(58) Field of Classification Search
USPC ........... 188/65.1–65.3, 67, 68, 134, 135, 187, 188/188, 105, 178, 72.2, 72.3, 72.6, 72.7, 188/72.9, 82.1–82.4, 82.74, 82.8, 82.9
See application file for complete search history.

(56) References Cited

U.S. PATENT DOCUMENTS 3,405,785 A * 10/1968 Schmid ........................ 188/72.2
3,430,736 A *  3/1969 Long ............................. 188/72.7
(Continued)

FOREIGN PATENT DOCUMENTS

DE          3615985 A1 * 11/1987
JP       61-036474 U    3/1986
JP       11-063060 A    3/1999

*Primary Examiner* — Robert A Siconolfi
*Assistant Examiner* — Charles Poon
(74) *Attorney, Agent, or Firm* — Sughrue Mion, PLLC

(57) ABSTRACT

The invention relates to a controlled-friction device comprising first and second elements mounted to move relative to each other in a sliding direction, wherein the device of the invention includes first and second friction members arranged symmetrically between the two elements in order to rub selectively against the second element, each of the friction members being urged towards a wedging position by a presser member, the first friction member being arranged, in a first direction of relative movement between the two elements along the travel direction, to tend to prevent relative movement between the two elements, and in a second direction to exert on the two elements an opposing friction force that depends on a stress applied against the first wedge member by the presser member; while the second friction member is arranged in the second direction to tend to prevent relative movement of the two elements, and in the first direction to exert on the two elements an opposing friction force that depends on a stress applied to the second wedge element by the presser member; the device further comprising neutralizing means for neutralizing that one of the friction members that is suitable for blocking relative movement of the element in one direction or the other, while leaving the other friction element to exert the opposing friction force.

5 Claims, 1 Drawing Sheet

(56) References Cited

U.S. PATENT DOCUMENTS

| | | | |
|---|---|---|---|
| 3,756,565 A * | 9/1973 | Sakai | 254/391 |
| 3,869,024 A * | 3/1975 | Hauth et al. | 188/72.5 |
| 4,819,765 A * | 4/1989 | Winkler et al. | 187/376 |
| 5,568,844 A * | 10/1996 | Matsuki et al. | 188/68 |
| 6,044,934 A * | 4/2000 | Nemeth | 188/67 |
| 6,293,573 B1 | 9/2001 | Olde-Heuvel et al. | |
| 6,412,606 B1 * | 7/2002 | Wu | 188/68 |
| 7,398,866 B2 * | 7/2008 | Baumann et al. | 188/72.7 |
| 7,588,128 B2 * | 9/2009 | Baumann et al. | 188/72.7 |
| 8,220,598 B2 * | 7/2012 | Valembois | 188/129 |
| 2004/0134723 A1 * | 7/2004 | Baumann et al. | 188/72.2 |
| 2005/0145449 A1 * | 7/2005 | Jelley et al. | 188/72.7 |
| 2006/0054440 A1 * | 3/2006 | Peuker et al. | 188/381 |
| 2010/0258386 A1 * | 10/2010 | Vollert et al. | 188/72.2 |

* cited by examiner

CONTROLLED-FRICTION SLIDING DEVICE, SUCH AS A DAMPER, WHICH CAN OPERATE IN TWO DIRECTIONS

CROSS REFERENCE TO RELATED APPLICATIONS

This application is a National Stage of International Application No. PCT/EP2010/054540, filed on Apr. 6, 2010, which claims priority from French Patent Application No. 09 01682, filed on Apr. 6, 2009, the contents of all of which are incorporated herein by reference in their entirety.

The invention relates to a controlled-friction sliding device, such as a damper, suitable for sliding in both directions.

STATE OF THE ART

Document FR 2 905 997 discloses a controlled-friction device comprising first and second elements mounted to move relative to each other in a sliding direction, the friction member being arranged between the two elements and being urged towards a wedging position by a presser member so that in one direction of relative movement of the elements along the travel direction it prevents the two elements from moving, and in the other direction of relative movement it exerts on the two elements an opposing friction force that depends on a stress applied to the wedge member by the presser member.

To this end, the friction member includes a friction surface rubbing against one of the elements and a bearing surface bearing against the other element, these two surfaces being at an angle to each other.

That device has the drawback of operating in one direction only.

OBJECT OF THE INVENTION

The invention seeks to make the known device symmetrical so as to allow movement under controlled friction in both directions.

BRIEF SUMMARY OF THE INVENTION

In order to achieve this object, there is provided a controlled-friction device comprising first and second elements mounted to move relative to each other in a sliding direction, wherein the device of the invention includes first and second friction members arranged symmetrically between the two elements in order to rub selectively against the second element, each of the friction members being urged towards a wedging position by a presser member, the first friction member being arranged, in a first direction of relative movement between the two elements along the travel direction, to tend to prevent relative movement between the two elements, and in a second direction to exert on the two elements an opposing friction force that depends on a stress applied against the first wedge member by the presser member; while the second friction member is arranged in the second direction to tend to prevent relative movement of the two elements, and in the first direction to exert on the two elements an opposing friction force that depends on a stress applied to the second wedge element by the presser member; the device further comprising neutralizing means for neutralizing that one of the friction members that is suitable for blocking relative movement of the element in one direction or the other, while leaving the other friction element to exert the opposing friction force.

Thus, the friction member that is in a position to block the movement is prevented by the neutralizing means from exerting its blocking effect. The elements are then free to move in the direction in question, against the opposing friction force exerted by the other friction member. During movement in the opposite direction, the friction members swap roles.

BRIEF DESCRIPTION OF THE FIGURES

The invention can be better understood with reference to the figures of the accompanying drawing, in which.

DETAILED DESCRIPTION OF THE FIGURES

Figure 1:
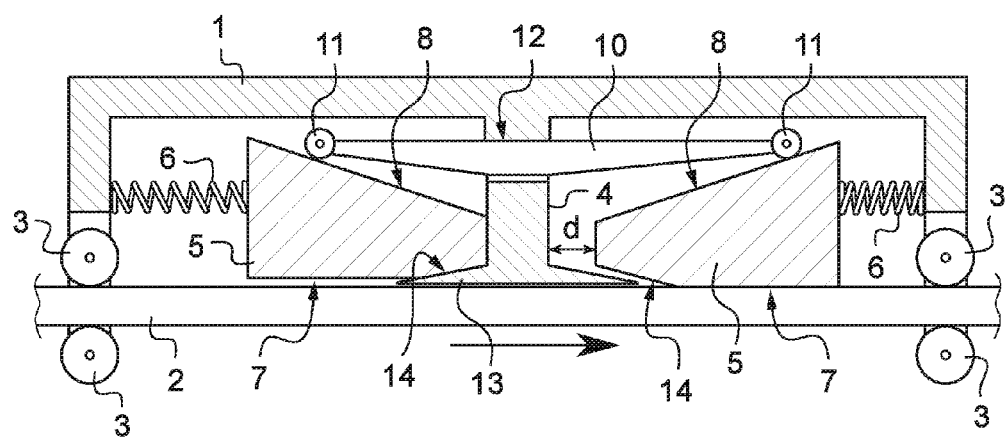
FIG. 1 is a diagrammatic view of a device of the invention.

With reference to FIG. 1, the device of the invention comprises a first element 1, here a stationary element, and a second element 2 that is mounted on the first element 1 to slide in a longitudinal direction. For this purpose, the first element 1 carries guide wheels 3 for guiding the second element 2. Here, and for the needs of explanation, it is assumed that the second element moves to the right, as represented by the arrow in the figure.

The first element 1 has a wall 4 on either side of which there are two friction members, specifically two wedges 5 that are urged towards the wall 4 by a presser member, here comprising two springs 6. Each of the wedges has a friction surface 7 rubbing against the second element 2, and an opposite bearing surface 8 forming an angle relative to the friction surface. The wedges 5 are arranged symmetrically on either side of the wall 4.

A balance arm 10 extends through the wall 4 so that its two ends bear against the bearing surfaces 8 of each of the wedges 5, here via wheels 11. The balance arm 10 bears against a back 12 of the wall 4 so that it is free to move lengthwise in a direction parallel to the travel direction of the second element 2.

Finally, the wall 4 is terminated on either side by two lifting feet 13, each having an oblique face suitable for co-operating with a corresponding oblique face 14 of a respective one of the wedges 5.

The device operates as follows. In a rest stage, when no relative movement is imposed between the first element 1 and the second element 2, the springs 6 center the wedges 5 and the balance arm 10 relative to the wall 4. The wedges 5 rest via their friction surfaces 7 against the second element 2.

Thereafter, when the second element 2 is moved, here to the right, the left wedge is pushed by the balance arm 10 against the second element 2 and moves together therewith until the oblique face 14 mounts onto the facing lifting foot 13. The left wedge is then lifted such that the friction surface 7 is separated from the second element 2. The wedge can no longer rub against the second element 2, so it is neutralized. It no longer opposes movement of the second element 2.

The left wedge is then held in abutment against the wall 4 by the corresponding spring 6. It can be seen that the balance arm 10 has been moved to the right by the same amount.

The right-hand wedge initially moves together with the second element 2, being pushed by the balance arm 10 until the left-hand wedge comes into abutment against the wall 4. During subsequent movement of the second element 2, the right-hand wedge tends to be entrained by the second element against the resistance delivered by the corresponding spring 6. The right-hand wedge is then in an equilibrium position in which it exerts on the second element a friction force that is controlled by the stress exerted by the spring 6. The right-hand wedge then performs its friction function.

Naturally, the device is symmetrical, and a movement of the second element 2 to the left would give rise to the right-hand wedge being neutralized and the left-hand wedge being activated as a friction member.

It should be observed that there is a dead zone when changing travel direction. When the second element changes direction, it entrains the right-hand wedge therewith until it comes into abutment against the wall 4, while the left-hand wedge is pushed back by the balance arm 10. This distance, referenced d in FIG. 1, corresponds to a dead zone in which the second element is not subjected to any opposing force.

It should also be observed that the balance arm 10 forms a member for moving the wedges 5 away by maintaining between them a given distance and by moving with them while they are both being entrained by the second element 2. The balance arm 10 also forms a bearing member for the bearing face 7, enabling the active wedge to produce the controlled friction force.

The above-explained principle may be implemented in numerous applications. By way of example, FIG. 2 is a diagram of a shimmy damper, e.g. suitable for use for damping the shimmy of an undercarriage.

Figure 2:
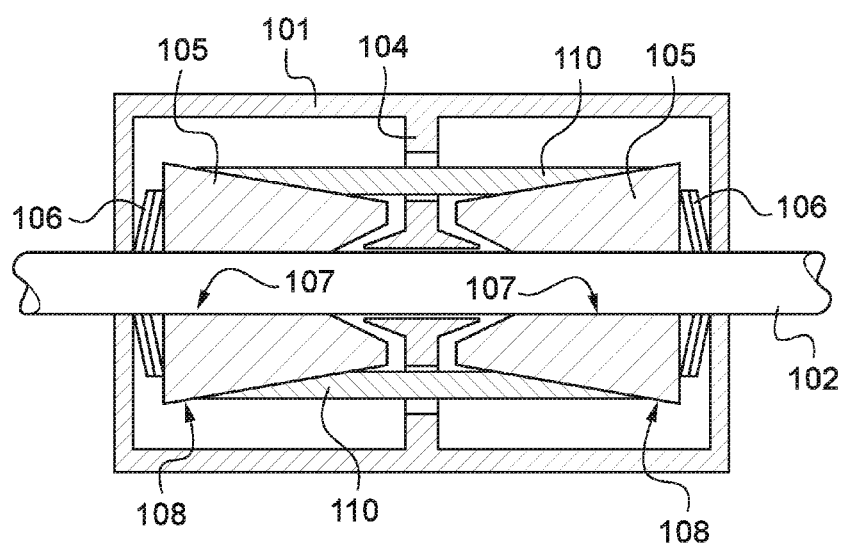
FIG. 2 is a diagrammatic section view of a friction damper implementing the invention.

In FIG. 2, elements that correspond to elements of FIG. 1 are given the same reference plus one hundred. The various parts shown are circularly symmetrical. There can be seen the two mutually movable elements, specifically the damper body 101 in which a rod 102 is slidably mounted. The two wedges 5 are replaced by friction members 105 forming bodies of revolution having a cylindrical inside friction surface 107 for rubbing against the rod 102, and an outside bearing surface 108 that is conical. There is a central wall 104 with a flared base forming lifting cones 113 corresponding to the lifting feet 13.

The spring member is constituted in this example by spring washers 106 that exert stress on the friction members urging them towards the wall 104.

The spacing and bearing member is constituted by a bushing 110 suitable for bearing against the conical outside bearing surfaces 108 of the friction members 105. The bushing 110 passes through the wall 104. For this purpose, the wall 104 and the bushing 110 have appropriate openings enabling the bushing 110 to move parallel to the travel direction of the rod 102. Like the balance arm 10, the bushing 110 serves to keep the friction members 105 at a constant spacing against the spring members 106 while also urging the friction members against the rod 102 (via the conical surfaces 108).

The assembly operates in the same manner as the device of FIG. 1. Thus, so long as the movements of the rod 102 relative to the body 101 remain shorter than the length of the dead zone, the rod is not subjected to any opposing friction force. However, if the movements of the rod 102 are longer than the length of the dead zone, then the rod is subjected to a controlled friction force. Thus, such a device is advantageously used for damping vibration presenting an amplitude that increases above some given threshold, which threshold is determined by the dead zone of the damper.

It should be observed that the friction member that comes closer to the wall 104 is neutralized by moving onto the lifting cone 113, thereby causing the friction member to expand radially, preventing it from rubbing against the rod 102.

The invention is not limited to the above description, but covers any variant coming within the ambit defined by the claims. In particular, although the two elements are movable in a rectilinear direction in the devices shown herein, it would naturally be possible to make provision for movement directions that are not rectilinear, e.g. that are circular. In addition, the association of two members could be repeated, either in series or in parallel.

What is claimed is:

1. A controlled-friction device comprising:
   first and second elements mounted to move relative to each other in a sliding direction, a presser member, and
   first and second friction members arranged symmetrically between the first and second elements in order to rub selectively against the second element, each of the first and second friction members being urged towards a wedging position by the presser member,
   wherein the first friction member is arranged, in a first direction of relative movement between the first and second elements along the travel direction, to tend to prevent relative movement between the first and second elements, and in a second direction to exert on the first and second elements an opposing friction force that depends on a stress applied against a first wedge member by the presser member;
   wherein the second friction member is arranged in the second direction to tend to prevent relative movement of the first and second elements, and in the first direction to exert on the first and second elements an opposing friction force that depends on a stress applied to a second wedge element by the presser member; and
   wherein the device further comprises neutralizing means for neutralizing that one of the first and second friction members that is suitable for blocking relative movement of the first and second element in one direction or the other, while leaving the other one of the first and second friction members to exert the opposing friction force.

2. A device according to claim 1, wherein the neutralizing means comprises lifting means for lifting a friction surface of each of first and second friction members at aim to separate said friction surface from that one of the first and second elements facing said friction surface.

3. A device according to claim 2, wherein the lifting means comprises wedge-shaped lifting portions on which one of the first and second friction members becomes engaged until it is separated from the second element, said friction member initially being entrained by the movement of the second element.

4. A device according to claim 3, wherein the wedge-shaped lifting portions are carried by a wall disposed between the first and second friction members.

5. A device according to claim 2, wherein the neutralizing means comprise a bearing and spacing member that extends between the first and second friction members to bear against a bearing surface of each of the first and second friction members in order to keep them spaced apart, the bearing and spacing member being free to move with the first and second friction members when they are both entrained by the second element.

* * * * *